June 6, 1961  E. T. STRICKLAND ET AL  2,987,100
APPARATUS AND METHOD FOR MAKING A HOLLOW
MULTI-LAYERED ARTICLE
Filed Oct. 24, 1958  6 Sheets-Sheet 1
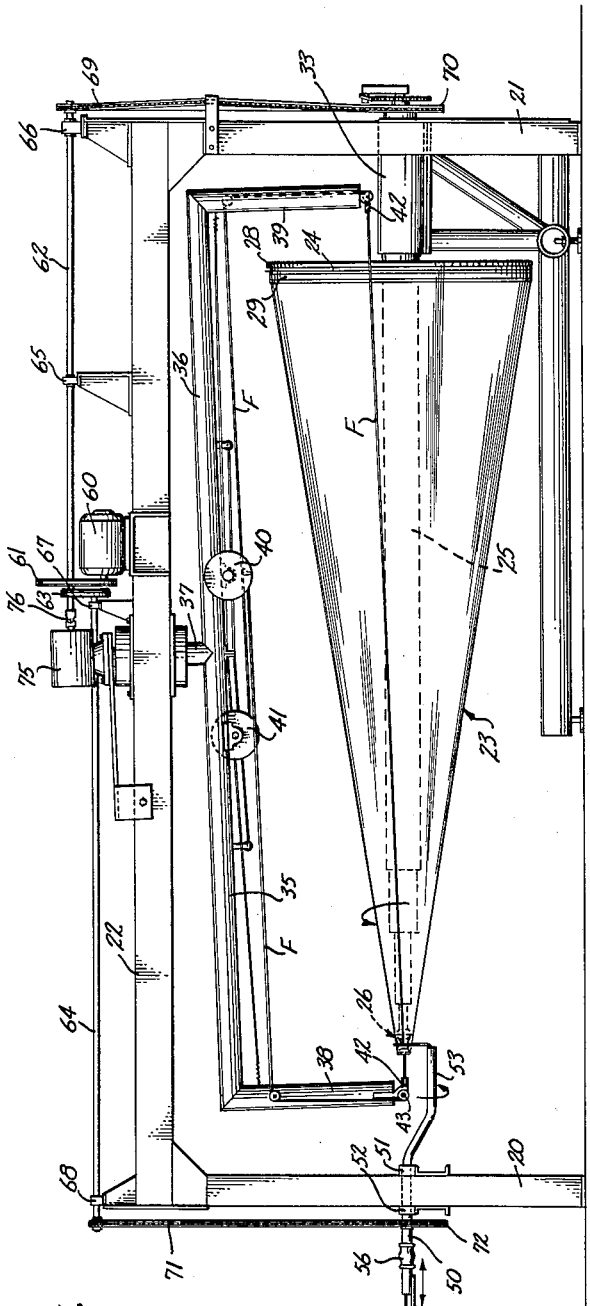
INVENTORS.
EDWARD T. STRICKLAND
HOMER C. AMOS
BY Schroeder, Hofgren,
Brady & Wegner
ATTORNEYS

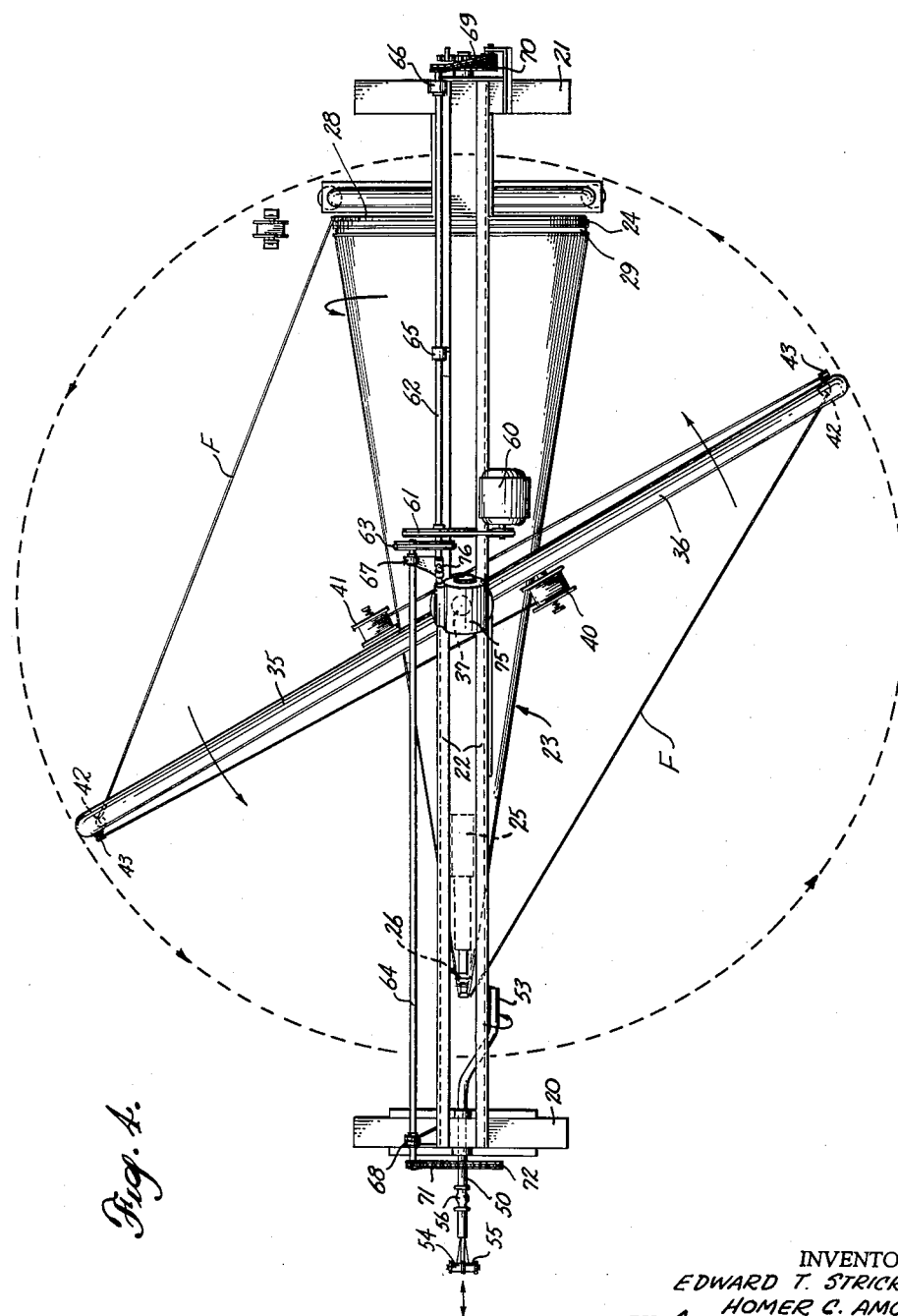

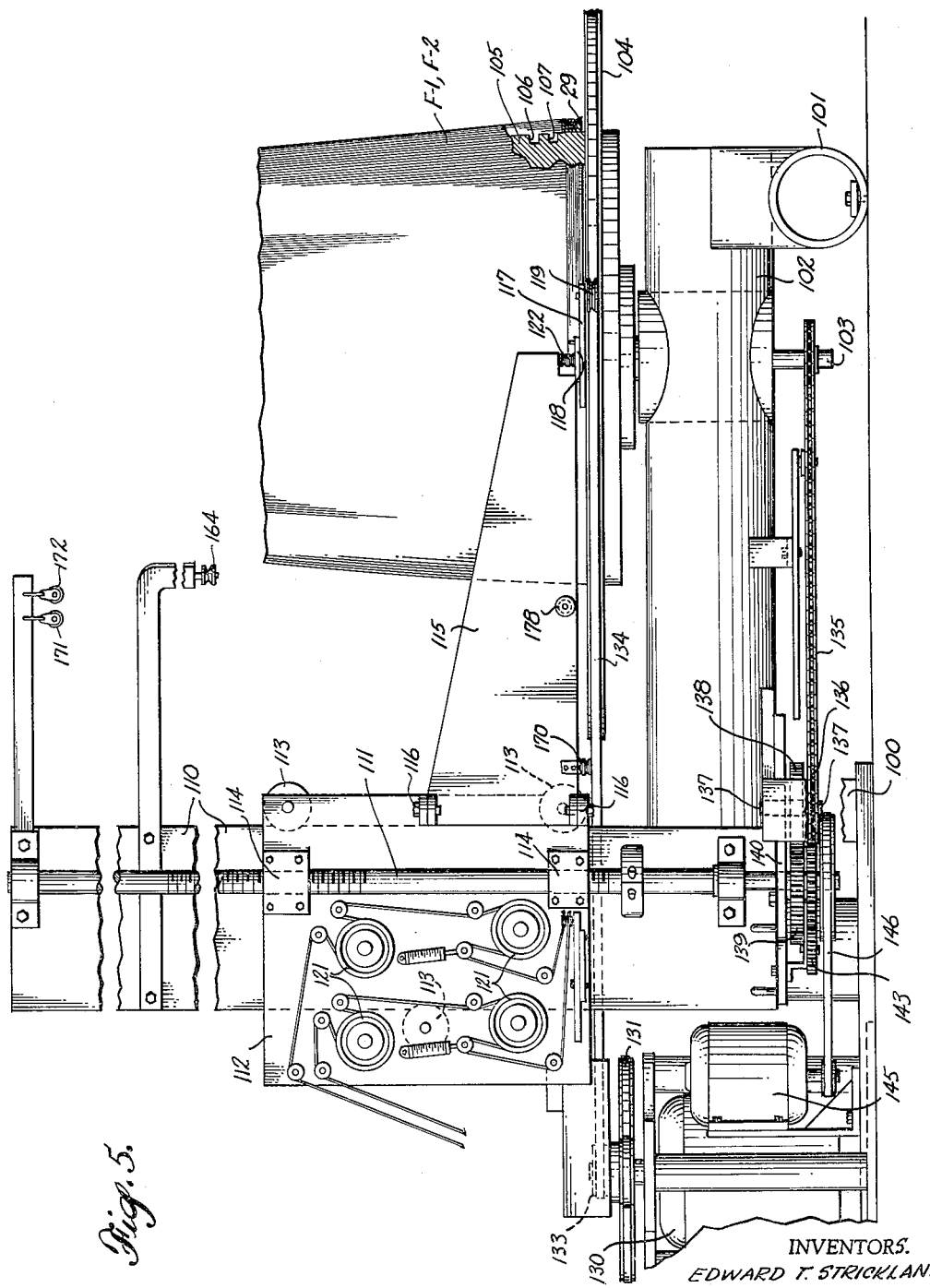

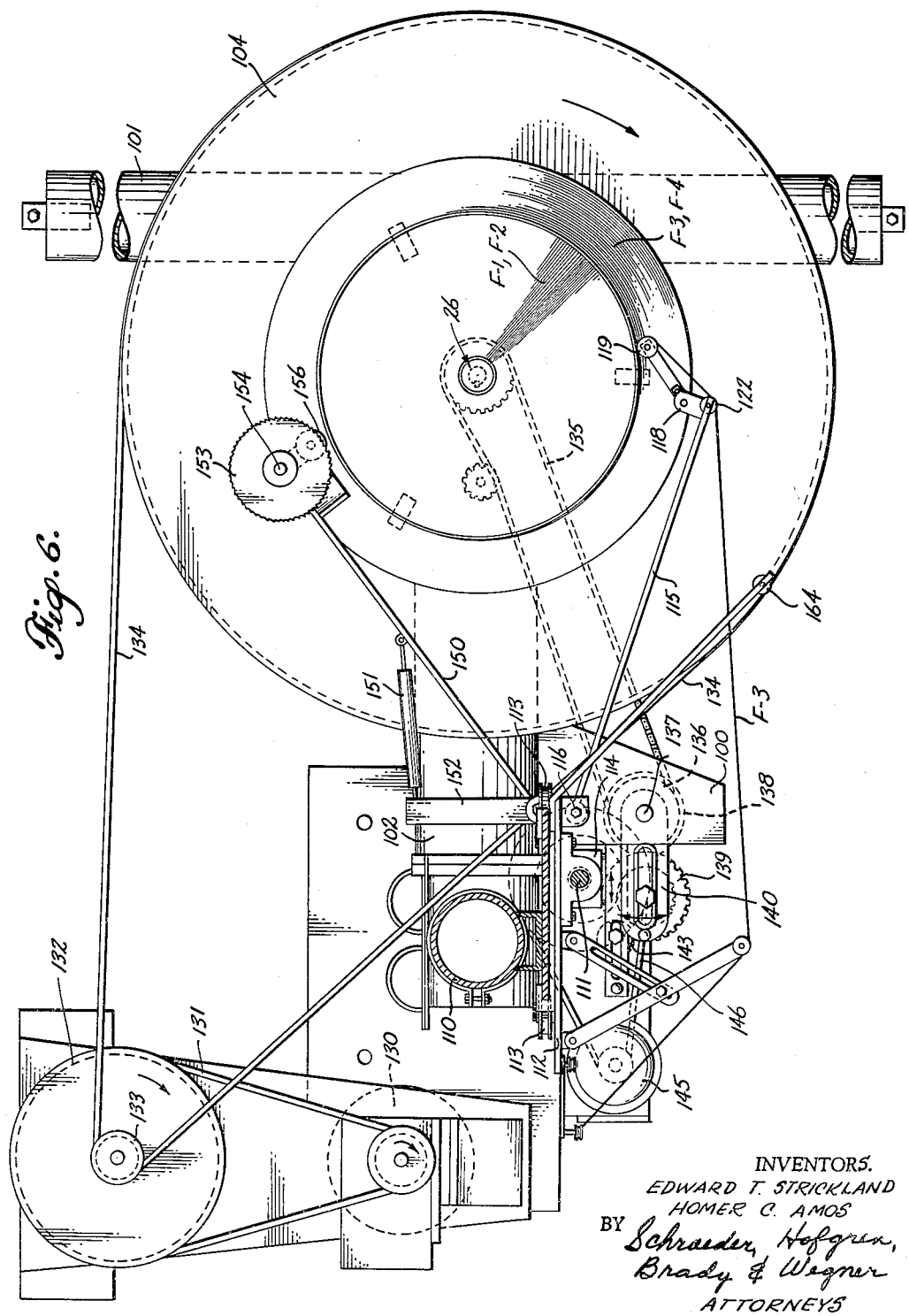

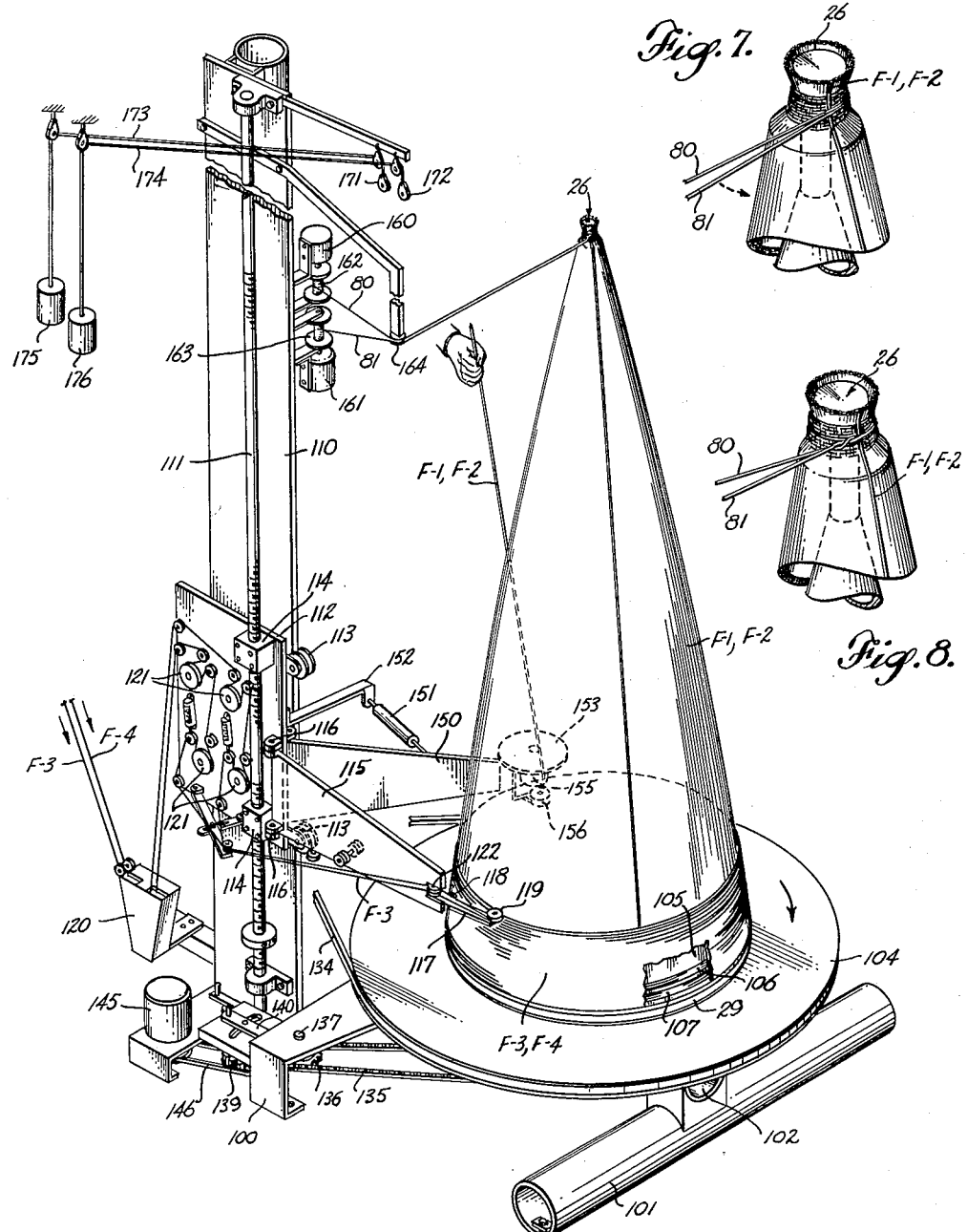

June 6, 1961

E. T. STRICKLAND ET AL 2,987,100

APPARATUS AND METHOD FOR MAKING A HOLLOW
MULTI-LAYERED ARTICLE

Filed Oct. 24, 1958

INVENTORS.
EDWARD T. STRICKLAND
HOMER C. AMOS
BY Schroeder, Hofgren,
Brady & Wegner
ATTORNEYS United States Patent Office 2,987,100
Patented June 6, 1961

2,987,100
APPARATUS AND METHOD FOR MAKING A HOLLOW MULTI-LAYERED ARTICLE
Edward T. Strickland and Homer C. Amos, Palm Springs, Calif., assignors, by mesne assignments, to Philbrick-Strickland Laminates, Inc., a corporation of Washington
Filed Oct. 24, 1958, Ser. No. 769,484
20 Claims. (Cl. 154—1.7)

This invention relates to the method of making an article composed of filaments and an apparatus utilizing such method.

In the fabrication of many articles such as aircraft or missile components, pressure vessels and radomes, a multi-layered article is constructed in which each layer is formed of filaments bonded together with a suitable binder. In these articles, the distribution of filaments is extremely important.

For example, in connection with radomes having generally rigid electrical and physical requirements and in which the shape includes an aerodynamic tapered section or a construction having varying diameters, the product requires exact control of thickness of each filament layer and of the completed article, and exact control of distribution of the longitudinally and circumferentially extending filaments. Longitudinal, as so used herein, refers to filaments distributed generally longitudinally or in an axial direction of the article, whereas circumferential refers generally to filaments which are distributed circumferentially or helically and in a direction substantially transverse to the axis of the article and the longitudinally extending filaments. Also, as used herein, the term filament is used to be generic to a variety of materials of which one specific material is long filament fiberglass, and is also generic to either a single strand material or rovings in which form fiberglass is available and which includes a number of ends and each end contains a number of discrete fibers. Other filamentized materials may be used depending upon the article requirements such as temperatures which must be withstood.

An object of this invention is to provide a new and improved method of making a multi-layered article.

Another object of this invention is to provide new and improved apparatus for making a multi-layered article.

Another object of the invention is to provide a method of making a multi-layered article having reinforcing filaments and which may be suitably bound together by a binder comprising, assembling a first layer of longitudinally extending filaments, each having an end disposed adjacent the ends of other filaments and with the ends of a plurality of said filaments individually captured for individual withdrawal from the layer, placing filaments on the filament layer extending generally transversely to the longitudinally extending filaments progressively in a direction toward said captured ends, and during the progressive placement of transverse filaments, sequentially withdrawing captured filaments from said first layer and severing the captured filaments as withdrawn from the layer adjacent the most recently placed transverse filament to obtain variable lengths of longitudinally extending filaments.

Another object of the invention is to provide an apparatus for assembling a series of filaments with an end of each filament captured comprising, an elongated form for receiving the filaments, first means traveling in a path about the ends of the form for laying successive lengths of continuous filament on the form, second means adjacent one end of the form traveling in a path lying in a plane at an angle to a plane including said first means' path for applying elongated tie-off media about said one form end after each pass of said first means about said one end, and means for operating said first and second means in timed relation to have said second means complete one revolution about said one form end after said first means has passed about said one form end to place a pair of filament lengths on the form.

Still another object of the invention is to provide apparatus for assembling a first layer of variable length filaments disposed longitudinally of a form and a layer of filaments positioned circumferentially about the form and on said first layer comprising, a mandrel for holding a first layer of longitudinally extending filaments cut to length with an adjacent end of said filaments individually captured by tie-off media, means for placing filaments on the first filament layer extending generally transverse to the longitudinally extending filaments progressively in a direction toward said captured ends, means for moving said tie-off media to sequentially withdraw captured filaments from said first layer, and means for severing a withdrawn filament adjacent the last applied transversely extending filament whereby to obtain variable lengths of said longitudinally extending filaments.

Further objects and advantages will become apparent from the following detailed description taken in connection with the accompanying drawings in which:

FIG. 1 is a side elevational view of apparatus for assembling a layer of longitudinally extending filaments;

FIG. 2 is a fragmentary perspective view of a portion of the apparatus shown in FIG. 1, and particularly the structure for tying-off the longitudinally extending filaments;

FIG. 3 is a fragmentary perspective view similar to FIG. 2, showing the tie-off mechanism progressed to a subsequent position;

FIG. 4 is a plan view of the apparatus shown in FIG. 1 with the filament winding arms shown in a different rotative position than in FIG. 1;

FIG. 5 is a fragmentary side elevation with parts broken away of the apparatus for assembling a first layer of filaments with a second layer;

FIG. 6 is a fragmentary plan view of the apparatus shown in FIG. 5 with parts in section;

FIG. 7 is a perspective view showing the first step in preparing the tie-off strings for removing the longitudinally extending filaments;

FIG. 8 is a perspective view showing the second step in preparing the tie-off strings for removing the longitudinally extending filaments;

FIG. 9 is a perspective view of the apparatus shown in FIGS. 5 and 6 with the parts in the same operational position as shown in FIG. 6.

Figure 10:
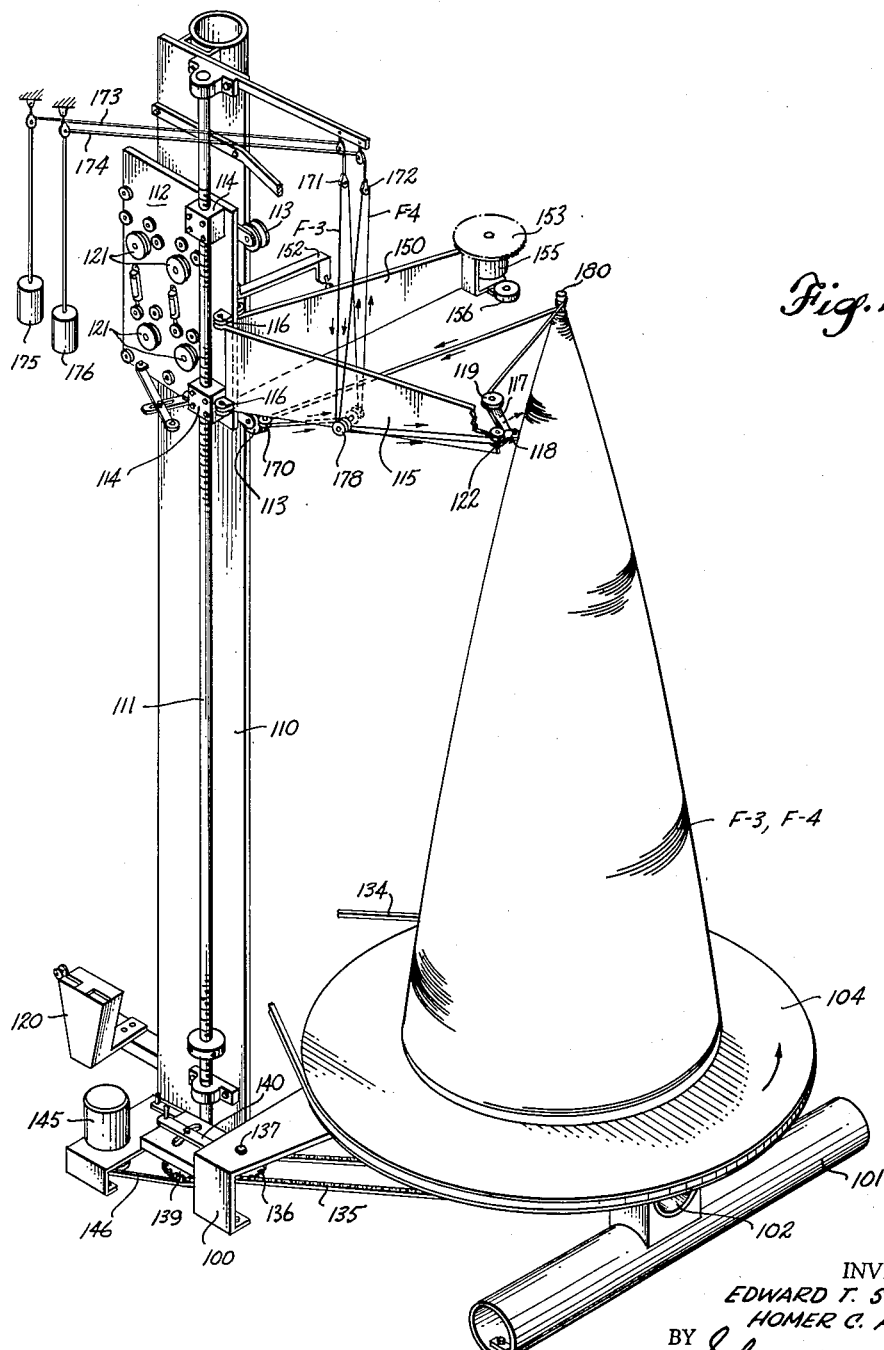
FIG. 10 is a perspective view with parts omitted showing the start of the rewind cycle for the circumferential filaments with the wind-on arm moved to a position away from the mandrel to facilitate threading of the appratus.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

In the mechanism disclosed herein, the apparatus disclosed in FIGS. 1 to 4 embodies means for assembling a layer of longitudinally extending filaments with an end of a plurality of said filaments individually captured for subsequent individual withdrawal from said layer. The apparatus of FIGS. 1 to 4 more particularly forms a first layer of filaments as a sock of longitudinally extending discrete filaments by winding a continuous filament about an elongated form and subsequently by cutting operations forming the filaments into discrete members. The capturing of the filament ends is accomplished by wrapping a tie-off media about an end of the form after each filament length is placed on the form, and this media is in the form of a pair of continuous strings or threads which are wound about the end of the form by having the tie-off mechanism driven in timed relation with the filament applying mechanism. This results in having the strings wound helically with the filaments positioned between convolutions of the strings.

The apparatus shown in FIGS. 5 to 9 embodies mechanism for placing filaments on the filament layer, formed by the apparatus of FIGS. 1 to 4, with the filaments extending generally transversely to the longitudinally extending filaments and applied progressively in a direction toward the captured ends of the longitudinally extending filaments. The apparatus of FIGS. 5 to 9 also functions to sequentially withdraw the captured filament ends and filaments from the layer of longitudinally extending filaments to sever the captured filaments adjacent the most recently placed transverse filament to obtain variable lengths of the longitudinally extending filaments whereby a controlled layer of filaments is obtained.

Referring particularly to the apparatus disclosed in FIGS. 1 to 4, a frame has a pair of legs 20 and 21 supporting a cross brace 22 extending between the upper ends of the legs. This frame supports the forming mechanism for the longitudinally extending filament layer.

An elongated form indicated generally at 23 is provided for receiving the longitudinally extending filaments and comprises a circular plate 24 mounted on a rotatable shaft 25 in spaced relation to a tie-off spool 26 also carried on the rotatable shaft 25. The tie-off spool 26 is keyed to the shaft 25, as indicated at 27. The circular plate 24 carries an elongated coil spring 28 wrapped thereabout to maintain the position of the filaments passed about the end of the form 23 and also carries a tie-off ring 29 which is used to hold one end of the filaments as more fully described hereinafter. The tie-off spool 26 has a central section 30 and enlarged ends 31 and 32 to maintain tie-off media in the central section 30. The rotatable shaft 25 of the form is journaled in a bearing 33 supported for rotation in the frame leg 21.

Means traveling in a path about the ends of the form for laying successive lengths of continuous filament on the form comprises a pair of arms 35 and 36 formed as a single member and having a drive shaft 37 extending at right angles to the length of the arms 35 and 36. The drive shaft 37 is rotatably journaled in the cross part 22 of the frame whereby the arms are rotatable about an axis almost normal to the rotation axis of the form shaft 25. The arms 35 and 36 each have an end 38 and 39 respectively, spaced from each other a distance greater than the length of the form 23 and extending downwardly to positions closely adjacent the rotation axis of the form.

The filament laying means further includes filament supply spools 40 and 41 carried on the arms 35 and 36, each of which has a continuous filament F wound thereon and which pays off the filament through suitable spring tension pulley systems to guide pulleys 42 and 43 carried at each of the ends 38 and 39 of the filament applying arms. Due to the slight inclination of the driveshaft 37 for the filament applying arms, each filament applying pulley 42, when adjacent the tie-off spool 26, is at the axis of rotation of the form shaft 25 while each pulley 42 at the opposite end of the form is slightly above the rotation axis in order to clear the journal structure 33.

Means are provided adjacent the tie-off end of the form 23 traveling in a path lying in a plane at an angle to a plane including the path of the filament applying pulleys 42 for applying tie-off media in the form of elongated members about the tie-off spool 26. This means comprises, a tie-off member 50 in the form of a hollow tube rotatably supported in bearings 51 and 52 carried on the frame leg 20 for rotation about an axis concentric with the axis of rotation of the form 23 and having an end 53 offset from this axis of rotation and overlapping the tie-off spool 26, as shown in FIG. 1. The end of the tie-off member overlapping the tie-off spool 26 travels in a path lying in a plane at an angle to the plane of travel of the filament applying pulleys 42. The tie-off member 50 carries a pair of supply spools 54 and 55 which each feed off an elongated string or thread 80, 81, which may be nylon, internally through the tie-off member 50 for passage out the end 53 and winding about the tie-off spool 26. The tie-off member 50 is also slidably mounted in the bearings 51 and 52 whereby manual grasping of a handle 56 permits sliding movement of the tie-off member to vary the location of the end 53 lengthwise of the spool 26 to spread out the buildup of the strings.

The drive means for rotating the form 23, the filament applying arms 35, 36, and the tie-off member 50 in timed relation, comprises a motor 60 driving a belt 61 for rotating an elongated shaft 62 extending to a position overlying frame leg 21. A belt 63 connects the shaft 62 to a second elongated shaft 64 extending to a position overlying the frame leg 20. The shafts 62 and 64 are rotatably journaled on top of the cross bar 22 by a plurality of bearings 65, 66, 67 and 68. The drive shaft 62 is connected by a reversed chain 69 to a gear mechanism 70 for rotating the form shaft 25. This gear mechanism includes adjustment means (not shown) to advance the position of the form one step after every application of a number of filaments, as for example 100, to avoid a buildup of filaments in the same positions on the form 23. The drive shaft 64 is connected by a chain 71 to a sprocket 72 on the tie-off member 50. With this drive arrangement, the rotation of the form 23 and the tie-off member 50 is in the directions as shown by the arrows in FIGS. 2, 3 and 4. The drive for the winding arm drive shaft 37 is through a gear reducer 75 which is driven from the drive shaft 62 through a universal coupling 76. The timed relation of the parts is such that the tie-off member 50 makes one complete revolution for each half revolution of the drive shaft 37 whereby the tie-off media is completely wound one revolution about the tie-off spool 26 after either of the winding arm ends 38 or 39 passes by the tie-off spool.

The operation of the apparatus shown in FIGS. 1 to 4 is believed apparent from the foregoing description. However, it may be briefly summarized for a complete understanding thereof.

The tie-off strings 80 and 81 are secured at one end to the tie-off spool 26. As the form 23 rotates, the winding arms 35 and 36 will also be rotating to have each of the arm ends 38 and 39 paying out continuous lengths of filament F disposed longitudinally of the form. Looking particularly at FIGS. 2 and 3, after one of the winding arm ends passes around an end of the form, the tie-off strings 80 and 81 pass about a length F-1 of filament F and, as shown in FIG. 3, then pass around a length F-2 of filament F. The next succeeding winder arm end will pass by the tie-off spool 26, and the tie-off member end 53 will make another revolution to again capture the next filament lengths F-1 and F-2. Each convolution of the strings 80 and 81 captures a pair of filament lengths F-1 and F-2 and spaces them from succeeding filament lengths. The tie-off may be commenced with the initial laying up of longitudinally extending filaments on the form 23 or, if it is desired to have some filaments not captured, the tie-off operation may begin after some filaments have been placed on the form 23. It will be seen that continuous filaments are laid on the form 23 although distinct filament lengths form a layer of the form.

After the layer of filaments is built up to the desired extent on the form 23, a tie-up member is passed around the tie-off ring 29 to secure the filament lengths at one end thereof to the ring. The filaments are then cut beyond that point to free the filaments from form plate 24. The filaments are then removed from the form with the tie-off spool 26 to form a layer of longitudinally extending filaments in the form of a sock which are then associated with other filaments as hereinafter described.

The apparatus, as shown in FIGS. 5 to 9, assembles the first layer of longitudinal filaments with a layer of filaments positioned circumferentially about the first layer.

This apparatus comprises, a frame having base members 100 and 101 supporting a frame member 102 having a rotatable support for a drive shaft 103 carrying a turntable 104. The turntable 104 rotatably supports a form such as a mandrel 105. The mandrel 105 receives the sock of longitudinally extending filaments F-1 and F-2 assembled by the apparatus of FIGS. 1 to 4 with one end of the sock secured to the mandrel by wrapping of a line around the filaments F-1 and F-2 and with the line fitting in the grooves 106 and 107 at the base of the mandrel 105.

Means for applying filaments on the layer of filaments F-1 and F-2 circumferentially and extending generally transverse to the length of the filaments F-1 and F-2 progressively in a direction toward the captured ends of the filaments F-1 and F-2 at the spool 26, comprises the following structure. A column 110 extends upwardly in a direction generally parallel to the axis of rotation of the turntable 104 and supports a rotatable lead screw 111 and a movable carriage 112 having guide rollers 113 mounting the carriage on the column for up and down movement. Threaded blocks 114 on the carriage co-act with the lead screw to produce either up or down movement of the carriage in response to rotation of the lead screw. The carriage has a first arm 115 pivotally mounted thereon by the pivots 116 and the arm extends laterally to a position adjacent the mandrel 105 and carries a secondary arm 117 pivoted thereto at 118 which, as shown in FIG. 9, has a pulley 119 for directing a filament onto the mandrel as the mandrel rotates. In the illustrated embodiment, two filaments are applied by the pulley 119. The path of these filaments F-3 and F-4 is through a mechanism 120 for applying a granular material to the filaments to reduce slipperiness thereof, and to the carriage 112 where they pass around a series of pulleys 121 constructed to place the desired degree of tension on the filaments for proper application onto the mandrel. The filaments F-3 and F-4 then pass about a pair of pulleys 122 at the end of the arm 115 and onto the pulley 119 previously referred to.

Means for rotating the lead screw 111 and the turntable 104 in predetermined relation to each other comprises, a motor 130 driving a belt 131 engageable with a pulley 132 having a second pulley 133 of a reduced size which drives a belt 134 passing around the periphery of the turntable. The shaft 103 rotatably supporting the turntable at its lower end drives a chain 135 which drives a sprocket 136 mounted on a shaft 137. The shaft 137 has a gear 138 which meshes with a gear 139 supported by a pivoted link 140 which pivots about the shaft 137. The gear 139 is integral with a small diameter gear 141 which is driven from gear 139, and the gear 141 is selectively engageable with a gear 142 carried on the lower end of the lead screw 111. With the gears 141 and 142 in mesh, a rotation is given to the lead screw in a direction to elevate the carriage 112. The carriage may be moved downwardly by swinging the link 140 in a direction outwardly away from the lead screw 111 and then moving The gear 139 is integral with a smaller diameter gear 141 and 142 to reverse the travel of the carriage.

An auxiliary high speed motor 145 is provided to drive a gear 146 connected to the lead screw when it is desired to move the carriage at a higher rate of speed, and this is done with the gears 141 and 142 out of mesh and with the gear 143 also out of engagement.

The carriage 112 carries means for severing a withdrawn filament F-1 or F-2 which is withdrawn from the layer of longitudinally extending filaments to obtain variable lengths of said filaments. This means comprises, an arm 150 pivotally mounted on the carriage 112 and yieldably urged toward the mandrel by a yieldable urging means 151 such as a screen door cylinder connected between the arm 150 and a fixed bracket 152. The arm 150 supports a disk saw 153 rotatable on a vertical shaft 154 and driven by a small electric motor 155. The arm 150 also supports a guide or follower roll 156 engageable with the exterior of the form to control the distance of the saw edge from the layer of filaments F-1 and F-2 against the urging of the yieldable means 151. The saw 153 is disposed at a level related to that of the filament applying pulley 119 to be slightly above said pulley and thus be immediately above the last applied circumferential filaments F-3 and F-4.

Means are provided for moving the filaments F-1 and F-2 successively outwardly from their layer during the interval in which the circumferential filaments F-3 and F-4 are being wound circumferentially about the form from the lower end thereof toward the captured end of the filaments F-1 and F-2. This means comprises a pair of motors 160 and 161 mounted near the top of the column 110 which drive the windup spools 162 and 163 for the tie-off strings 80 and 81 respectively. The strings, in traveling to the spools, pass about a guide pulley 164 supported from the column 110. This operation occurs after the filaments F-1 and F-2 have been cut beyond the tie-off strings 80 and 81 to form the filaments into discrete lengths.

As shown in FIGS. 7 and 8, the tie-off strings 80 and 81 are placed in association with an end of the filaments F-1 and F-2 by the steps which involve, looking at FIG. 7, holding the string 80 as shown, and unwinding the string 81 one turn in a counterclockwise direction which means that the string 80 is to the outside of either an F-1 or F-2 filament and the string 81 is at the inner side of said filament. The string 81 is then twisted twice around the string 80 to result in the arrangement shown in Fig. 8. As the strings 80 and 81 are wound up on their spools 162 and 163, as permitted by rotation of the form in the direction of the arrow in FIG. 9, each of the longitudinally extending filaments F-1 and F-2 will successively be drawn away from the filament layer with the lower part of the filament against the saw 153 as shown diagrammatically in FIG. 9. The withdrawn filament will thus be cut at a point immediately adjacent the last applied circumferential filament of filaments F-3 and F-4. The cutting of the filaments F-1 and F-2 may be facilitated by manually grasping the upper end thereof and swinging the filament outwardly to a greater degree to increase the angle of the filament relative to the saw and get a better cutting angle. With each revolution of the turntable an F-1 filament and an F-2 filament will be withdrawn from the filament layer.

In order to increase the quality of the circumferential layer of filaments F-3 and F-4 placed on the form, the circumferential layer of filaments F-3 and F-4 is progressively taken off the form and reapplied thereto from the top to the bottom of the form. This operation is illustrated in FIG. 10 in which an additional length of circumferential filaments F-3 and F-4 is provided at the upper end of the form and this extra length is threaded through a pulley 170 and the filaments F-3 and F-4 then individually travel upwardly about tensioning pulleys 171 and 172. The pulleys 171 and 172 are suspended by cables 173 and 174 connected to weights 175 and 176 whereby tension is applied to the filaments. The filaments then pass downwardly about pulleys 177 and then to the applying pulley 119 which is in a different position due to swinging of the support arm 117 therefor. This operation is also accompanied by reversing the direction of rotation of the turntable 104 as shown by the arrow in FIG. 10 so that the free end of the extra circumferential filament material may then be secured to the upper end of a spike 180 present at the end of the mandrel. This spike was beneath the tie-off spool 26 which has now been removed. Rotation of the mandrel will thus result in circumferential filaments F–3 and F–4 being applied at the upper end of the form, and the filaments are applied by unwinding from the form at a point beneath where they return to the form. This provides a better control in the application of the filaments since the winding is occurring along an increasing or sloped path formed by the mandrel shape, and any tendency of the filaments to slip toward the top of the form is resisted by the presence of a previously applied filament.

The method of making a multi-layered article embodies the steps of first assembling a series of longitudinally extending filaments F–1 and F–2 in a layer with the ends of a plurality of the filaments captured as by the tie-off strings 80 and 81 as accomplished by the apparatus of FIGS. 1 to 4. The layer is cut at the ends thereof to form the layer into a sock supported on the mandrel 105 positioned on the turntable 104 of the mechanism shown in FIGS, 5, 6 and 9. A circumferential layer of filaments F–3 and F–4 is then placed on the layer of filaments F–1 and F–2 circumferentially of the form, and with the filaments F–3 and F–4 extending generally transversely to the filaments F–1, F–2. This application of the circumferential filaments occurs progressively in a direction toward the captured end of the filaments F–1, F–2, and during this progressive application the filaments F–1 and F–2 are sequentially withdrawn from the layer thereof by the tie-off strings 80 and 81. The strings are progressively pulled off the tie-off spool 26 as the mandrel 105 is rotated by the turntable 104. The withdrawn filaments F–1 and F–2 have a portion of their length held against the form by the circumferential filaments F–3 and F–4 while the filament is cut where free to swing outwardly against the saw 153. With the completion of the circumferential filament application, the longitudinally extending filaments F–1 and F–2 will vary in length in the layer thereof to provide a controlled amount of longitudinally extending filament material in the layer.

The next step in the method may be as described in connection with FIG. 10 in which the circumferential filament layer is withdrawn and reapplied to obtain a better controlled tension of winding thereof.

With an article having a plurality of layers in excess of the two described herein, additional layers may be formed in the manner described with respect to the filament layer F–1, F–2 and the filament layer F–3, F–4, until the desired number of layers is built up. The filaments may have had a binder material previously applied thereto, or this material may be associated with the filaments in some different manner, and after the buildup of the multi-layered article, the filaments are bound together as by a heat curing operation, if a thermosetting material is used.

In briefly summarizing the operation of the apparatus, first considering FIGS. 1 to 4, the form 23 rotates in the direction of the arrows shown in FIGS. 2 and 3, and the filament winding arms 35 and 36 rotate in the direction shown in FIG. 4, whereby to progressively place lengths of filament lengthwise of the form, and after each filament length has passed about the tie-off spool 26 to form the lengths F–1 and F–2, as shown in FIG. 3, the tie-off member 50 rotates to have the overlapped end thereof place the tie-off springs 80 and 81 about the filaments and tie them off. After the suitable layer of filaments is built up, the filament layer is withdrawn from the form and in its captured relation by the tie-off strings 80 and 81 at one end and the tie-off ring at the other end. This layer of filaments is then placed on the mandrel, which may have had a layer of circumferential filaments previously applied thereto, by having the spool 26 seated onto the spike 180 at the upper end thereof and the lower ends of the filaments F–1 and F–2 tied to the mandrel. Rotation of the turntable 104 in the direction of the arrow as shown in FIG. 9, and elevation of the carriage 112 results in progressively applying a circumferential layer of filaments F–3 and F–4 upon the longitudinally extending filaments F–1 and F–2 during which time the longitudinal filaments F–1 and F–2 are cut to different lengths.

We claim:

1. Apparatus for assembling filaments in straight lengths to form a sock comprising, a form rotatable about an axis, a winder comprising a pair of arms spaced from each other a distance greater than the length of the form and rotatable about an axis generally normal to the rotation axis of the form, means on each arm for laying a length of continuous filament on said form each time an arm traverses the rotation axis of the form, a tie-off member adjacent an end of the form rotatable about an axis coincident with that of the form and having an end adjacent said end of the form offset from the tie-off member rotation axis and overlapping the form end for applying a pair of lengths of continuous string about the adjacent form end, and drive means for rotating said form, said winder and said tie-off member in timed relation to have the arms lay successive lengths of filament in spaced relation circumferentially of the form with the tie-off member placing the strings about each of the filament lengths laid about the adjacent end of the form.

2. An apparatus as defined in claim 1 wherein said tie-off member is in the form of a hollow tube through which the continuous strings extend from a supply thereof, and means mounting said tie-off member for movement longitudinally of its axis of rotation to spread out the string length convolutions applied to said form end.

3. An apparatus as defined in claim 2 in which said form has a tie-off spool at said form end, said spool having a central section about which the strings are applied and enlarged ends whereby the tie-off strings are confined on the form.

4. Apparatus for assembling a series of filaments comprising, an elongated form onto which the filaments are applied, a winder comprising a rotatable arm movable in a path about both ends of the form in a revolution, means on the arm for laying a length of continuous filament on said form in a direction predominantly lengthwise of the form each time said arm passes an end of the form, a tie-off member adjacent one end of the form having an end overlapping said one end and rotatable in a path lying in a plane at an angle to the plane of the winder arm path for winding elongated filament capturing media about said one end of the form, and means for rotating said winder arm and tie-off member in timed relation to have the tie-off member wind said media about said form end after each pass of said winder arm about said form end.

5. Apparatus for assembling a series of filaments with an end of each filament captured comprising, an elongated form for receiving the filaments, first means traveling in a path about the ends of the form for laying successive lengths of a continuous filament on the form predominantly lengthwise of the form, second means adjacent one end of the form traveling in a path lying in a plane at an angle to a plane including said first means path for applying an elongated member about said form end subsequent to a pass of said first means about said one end, and means for operating said first and second means in timed relation to have said second means complete one revolution about said one form end subsequent to passage of said first means about said one end.

6. Apparatus for assembling a series of filaments with an end of a plurality of the filaments captured comprising, an elongated form for receiving the filaments, first means traveling in a path to place lengths of filament successively on the form and lengthwise thereof, second means adjacent one end of the form traveling in a path lying in a plane at an angle to the length of said filaments for applying an elongated member about said form end, and means for operating said first and second means in timed relation to have said second means wind the elongated member over each filament end placed on the form.

7. Apparatus for assembling a first layer of variable length filaments disposed longitudinally of a form and a layer of filaments positioned circumferentially about the form and on said first layer comprising, a mandrel for holding a sock forming a layer of longitudinally extending filaments cut to equal lengths with an adjacent end of said filaments individually captured by elongated tie-off media adjacent the top of the mandrel, a rotatable turntable supporting said mandrel for rotation, a column extending in a direction parallel to the turntable axis of rotation, a carriage mounted for movement along the column, means for moving the carriage upwardly along the column, means on the carriage for circumferentially applying a filament progressively along the length of the mandrel as the mandrel rotates and the carriage travels along the column, a second means on the carriage for cutting a longitudinally extending filament when said filament is moved out of said layer, and means on said column for winding the elongated tie-off media as paid out by rotation of the mandrel to pull successive captured longitudinally extending filaments from said layer and against said cutting means.

8. An apparatus as defined in claim 7 in which said second means includes an arm yieldably urged toward the mandrel, a rotatable cutter carried on said arm, and a follower on said arm engageable with the mandrel to determine the distance of the cutter from the mandrel, said cutter being slightly above the level of said filament applying means on the carriage to cut off longitudinally extending filaments adjacent the last applied circumferential filament.

9. Apparatus for assembling a first layer of variable length filaments disposed longitudinally of a form and a layer of filaments positioned circumferentially about the form and on said first layer comprising, a mandrel for holding a sock forming a layer of longitudinally extending filaments cut to equal lengths with an adjacent end of said filaments individually captured by a pair of elongated tie-off strings, a rotatable turntable supporting said mandrel for rotation, a column extending in a direction parallel to the turntable axis of rotation, a carriage mounted for movement along the column, means on the carriage for circumferentially applying a filament progressively along the length of the mandrel as the mandrel rotates and the carriage travels along the column, a second means on the carriage for cutting a longitudinally extending filament when said filament is moved out of said layer, and means on said column for winding the tie-off strings as payed out by rotation of the mandrel to pull successive captured longitudinally extending filaments from said layer and against said cutting means.

10. An apparatus as defined in claim 9 in which said second means includes an arm yieldably urged toward the mandrel, a cutter carried on said arm, and a follower on said arm engageable with the mandrel to determine the distance of the cutter from the mandrel, said cutter being slightly above the level of said filament applying means on the carriage to cut off longitudinally extending filaments adjacent the last applied circumferential filament.

11. An apparatus as defined in claim 9 and including, means on said carriage for rewinding the circumferential filament layer including members directing the circumferentially applied filament off and back onto the mandrel upon reverse movement of the carriage and turntable.

12. Apparatus for assembling a first layer of variable length filaments disposed longitudinally of a form and a layer of filaments positioned circumferentially about the form and on said first layer comprising, a mandrel for holding a first layer of longitudinally extending filaments cut to length with an adjacent end of said filaments captured by tie-off media, means for placing filaments on the first filament layer extending generally transverse to the longitudinally extending filaments progressively in a direction toward said captured ends, said mandrel and filament placing means being relatively movable means for moving said tie-off media to sequentially withdraw captured filaments from said first layer, and means for severing a withdrawn filament adjacent the last applied transversely extending filament whereby to obtain variable lengths of longitudinally extending filaments.

13. A method for making an article having a layer of filaments extending longitudinally thereof comprising, assembling a first layer of longitudinally extending filaments each having an end disposed adjacent an end of the other filaments in said first layer and with some of the first layer filaments having said end individually captured, assembling a second layer of filaments upon said first layer at an angle thereto and progressively in a direction toward said captured ends, sequentially moving the captured ends of said filaments in the first layer to sequentially withdraw said filaments from the first layer, and sequentially severing the withdrawn filaments adjacent the portion of said second layer most recently placed upon said first layer whereby the filaments in the first layer vary in length and are beneath said second layer.

14. The method of making a multi-layered article having reinforcing filaments and a binder comprising, assembling a layer of longitudinally extending filaments cut to lengths approximating the length of the article with adjacent ends of a plurality of said filaments individually captured for individual withdrawal from the layer, placing a filament extending generally transversely to the longitudinally extending filaments progressively on the filament layer in a direction toward said captured ends, and during the progressive placement of said transverse filament sequentially withdrawing captured filaments from said layer and severing the captured filaments adjacent the most recently placed transverse filament length to obtain variable lengths of longitudinally extending filaments.

15. The method of making a multi-layered article having reinforcing filaments comprising, assembling a layer of longitudinally extending filaments with each having an end adjacent an end of the article with said end of a plurality of said filaments individually captured for individual withdrawal from the layer, placing filaments extending generally transversely to the longitudinally extending filaments progressively on the filament layer in a direction toward said captured ends, and during the progressive placement of transverse filaments sequentially withdrawing captured filaments from said layer and severing the captured filaments adjacent the most recently placed transverse filament to obtain variable lengths of longitudinally extending filaments.

16. A method for making a hollow multi-layered article having a layer of filaments extending longitudinally thereof and another layer extending transversely thereof, comprising, forming a first layer as a sock of longitudinally extending discrete filaments with adjacent ends of a plurality of filaments captured, supporting said sock on a mandrel, winding a circumferential layer of filaments progressively about the sock in a direction toward said captured ends, during the progressive placement of circumferential layer filaments sequentially moving the captured filament ends to withdraw said filaments from said first layer, and severing said withdrawn filaments to obtain variable lengths thereof with part of the severed filament under said circumferential layer.

17. The method of claim 16 in which the circumferential layer after completion thereof is progressively withdrawn and again placed on said first layer in a direction opposite to the initial placement of circumferential layer filaments.

18. A method for making a hollow multi-layered article having a layer of filaments extending longitudinally thereof and another layer extending transversely thereof, comprising, forming a first layer as a sock of longitudinally extending discrete filaments with adjacent ends of a plurality of filaments captured by a pair of elongated strings wound helically about said filament ends with a filament positioned between each convolution of the strings, supporting said sock on a mandrel, winding a circumferential layer of filaments progressively about the sock in a direction toward said captured ends, during the progressive placement of circumferential layer filaments unwinding said strings to sequentially move the captured filament ends to withdraw said filaments from said first layer, and severing said withdrawn filaments to obtain variable lengths thereof.

19. A method for making a multi-layered article comprising, assembling a first layer of filaments on a form as a sock of longitudinally extending filaments, wrapping a length of a pair of strings around an end of each filament length as the length is placed on the form to have adjacent filament ends individually captured by the strings, winding a circumferential layer of filaments progressively along the sock from one end to the other in a direction toward said captured filament ends, simultaneously with the winding of the circumferential layer unwinding said pair of strings with the string lengths being one at each side of a captured filament to sequentially obtain control of the captured filaments, and severing the captured filaments successively immediately adjacent the last applied circumferential filament.

20. The method of making a multi-layered article comprising, assembling a first layer of filaments as a sock of longitudinally extending filaments by winding a continuous filament about a form, continuously wrapping a pair of strings around an end of the sock as the filament is extended about the end, and cutting the sock filaments beyond the wrapped ends thereof after the sock is assembled to separate the filaments with adjacent filament ends individually captured by the strings, shifting said strings to have one at each side of a filament and crossing said strings outwardly of the first captured filament end, winding a circumferential layer of filaments progressively along the sock from one end to the other in a direction toward said captured ends, simultaneously with the winding of the circumferential layer unwinding said pair of strings with the string lengths being one at each side of a captured filament to sequentially obtain control of the captured filaments, and severing the captured filaments successively immediately adjacent the last applied circumferential filament.

References Cited in the file of this patent

UNITED STATES PATENTS 2,731,067    Miller                 Jan. 17, 1956